United States Patent [19]

Katsuhiro et al.

[11] Patent Number: 4,475,990

[45] Date of Patent: Oct. 9, 1984

[54] METHOD OF FORMING LEAD STORAGE BATTERIES

[75] Inventors: Takahashi Katsuhiro, Chigasaki; Watanabe Keiichi, Amagasaki; Jinbo Hiroyuki, Kamakura; Hoshihara Naoto, Chigasaki, all of Japan

[73] Assignee: Matsushita Electrical Industrial Co., Ltd., Kadoma, Japan

[21] Appl. No.: 563,418

[22] PCT Filed: Mar. 29, 1983

[86] PCT No.: PCT/JP83/00097

§ 371 Date: Dec. 2, 1983

§ 102(e) Date: Dec. 2, 1983

[87] PCT Pub. No.: WO83/03714

PCT Pub. Date: Oct. 27, 1983

[30] Foreign Application Priority Data

Apr. 6, 1982 [JP] Japan .................................. 57-57519
Apr. 6, 1982 [JP] Japan .................................. 57-57520
Jul. 5, 1982 [JP] Japan .................................. 57-117286

[51] Int. Cl.³ .......................................... H01M 10/44
[52] U.S. Cl. ..................................................... 204/2.1
[58] Field of Search ........................................ 204/2.1

[56] References Cited

U.S. PATENT DOCUMENTS 3,629,006 12/1971 Hill ........................................ 204/2.1
3,753,786 8/1973 Asta ....................................... 204/2.1
4,188,461 2/1980 Bant ....................................... 204/2.1

*Primary Examiner*—Thomas Tufariello
*Attorney, Agent, or Firm*—Wenderoth, Lind & Ponack

[57] ABSTRACT

This invention relates to a method of forming a lead acid storage battery comprising a primary forming stage wherein pasted electrodes as immersed in an electrolyte selected from the group consisting of alkaline aqueous solutions, neutral aqueous solutions and dilute aqueous sulfuric acid solutions are charged for a short time and a secondary forming stage where said electrodes are further charged in a concentrated aqueous solution of sulfuric acid. The method contributes to improvements in the high rate discharge characteristic and cycle life characteristic of the battery.

7 Claims, 9 Drawing Figures

METHOD OF FORMING LEAD STORAGE BATTERIES

TECHNICAL FIELD

This invention relates to improvements in the method of forming a lead storage battery.

TECHNICAL BACKGROUND

Lead storage batteries have been closely associated with the development of automotive industry, and against this historical background, efforts have been concentrated on the improvement of starting characteristics, i.e. high rate discharge characteristics, and the cycle life which is related to shallow discharge characteristics. However, as the scope of application of lead storage batteries has remarkably expanded in recent years, with many equipment requiring a high rate discharge have been developed and mounted on vehicles, the compatibility of low rate discharge and high rate discharge characteristics has also become an important consideration.

The aging of characteristics due to deep discharge comprises the early deterioration of capacity that occurs in a comparatively short cycle and the degradation that occurs gradually over a comparatively long time. The early degradation became a prominent problem as lead-calcium-tin alloy and other non-antimony alloys came to be employed with an increasing frequency to meet the market demand for maintenance-free equipment. Under the circumstances the present inventors discovered that the battery structure comprising a less reactive $\alpha$-PbO$_2$ component disposed near the interface between the grid and the active material and a more reactive $\beta$-PbO$_2$ component disposed externally of said less-reactive component was effective in suppressing the above-mentioned early degradation. In addition, as a procedure for accomplishing such a structure, it was proposed that a primary forming stage where pasted electrodes are charged for a short time in an aqueous solution such as an aqueous solution of an alkali such as sodium hydroxide, potassium hydroxide or the like, a neutral aqueous solution of sodium sulfate, potassium sulfate, lithium sulfate or the like, or a dilute aqueous solution of sulfuric acid containing 15 weight % or less of H$_2$SO$_4$, which is suitable for the formation of $\alpha$-PbO$_2$, be conducted prior to the conventional formation in a relatively concentrated aqueous solution of sulfuric acid containing more than 15 weight % of H$_2$SO$_4$.

The above modification of the forming process resulted in a remarkable improvement of the early aging wherein passivation occurs as the discharge is concentrated at the interface between the grid and the active material. However, the aging due to the softening and fall-off of the active material which is manifested after the cycle has progressed fairly far remained yet to be improved. Moreover, this type of aging tended to be localized at the lower portion of the electrode even if, both in the primary and the secondary forming stage, due care was exercised to ensure a uniform treatment of the entire electrode by submerging in a sufficient amount of electrolyte solution. Thus, it was necessary to develop a new method of inhibiting the aging of the lower part of the electrode while maintaining the desirable high rate discharge characteristics.

On the other hand, in the above method which comprises using two dissimilar solutions in the primary and secondary forming stages, a procedure is generally interposed to eliminate the influence of the residual solution from the primary forming stage on the secondary forming stage. Therefore, the prior art teaches the procedures of withdrawing the electrodes from the electrolyte solution after primary formation, discarding the residual solution and washing the electrodes with water. Moreover, for the required formation a charging current of comparatively low current density is applied so as to improve the efficiency of formation without entailing evolution of gases and also to establish a uniform current distribution. In this formation, 0.2 qA is rarely exceeded when the theoretical positive electrode capacity is assumed to be qAh; a value between 0.05 qA and 0.1 qA is common. Notwithstanding the care exercised to ensure a uniform distribution of reaction, the high rate discharge characteristic imparted mainly at the secondary forming stage tends to lack uniformity. Thus, as long as this kind of forming procedure is employed, it is necessary to inhibit a non-uniformity of characteristics, especially the aging of high rate discharge characteristic.

It has thus been desired to further improve the above-mentioned forming method, for ensuring a satisfactory high rate discharge characteristic and inhibiting the early aging, so that the softening and fall-off of the active material which develops concentratedly at the lower part of the electrode in a long run may be alleviated and a uniformity of characteristics in connection with the application of such forming method be assured.

DISCLOSURE OF THE INVENTION

The present invention is characterized in that in the method of forming a lead acid storage battery comprising a primary forming stage wherein charging is effected in an electrolyte selected from the group of alkaline aqueous solutions, neutral aqueous solutions and dilute aqueous solutions of sulfuric acid and a secondary forming stage wherein charging is effected in a concentrated aqueous solution of sulfuric acid, the charging in the primary forming stage is performed with pasted electrodes being only partially immersed in the electrolyte solution.

In addition, for the purpose of ensuring a uniformity of high rate discharge characteristic which is established in the secondary forming stage, basically the secondary forming liquor is preferably prepared by adding sulfuric acid at the end of the primary forming stage without discarding the residual liquor. Another effective approach is to temporarily apply a large-current charging at the end of the primary forming stage or/and at the beginning of the secondary forming stage. The above current is preferably at least 0.3 qA based on the theoretical positive electrode capacity qAh. In addition, the inclusion of once or more charging step in the primary forming stage contributes further to an improved cycle life.

BEST MODE FOR CARRYING OUT THE INVENTION

The forming method according to the present invention will be described below in comparison with the reference example.

Expanded metal grids of lead-calcium-tin alloy were coated with a paste containing lead powder, sulfuric acid and water as main ingredients and dried to provide pasted electrodes sized 10 by 10 cm. Using 5 units of such pasted electrodes for the positive electrodes and 6 units for the negative electrodes, a battery which a theoretical positive electrode capacity (qAh) of 90 Ah was fabricated. A schematic view of the cell construction is given in FIG. 1.

Figure 1:
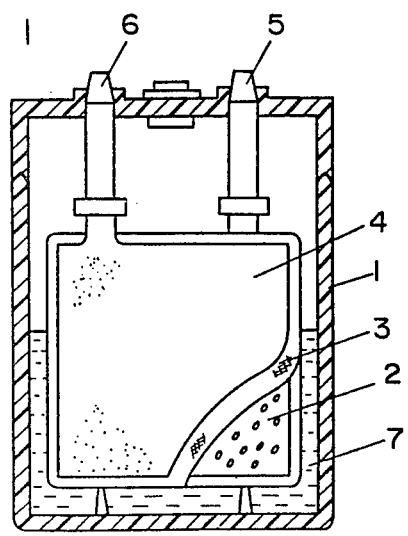
FIG. 1 is a longitudinal section view showing the lead storage battery in the primary forming stage of one embodiment of the invention.
Figure 2:
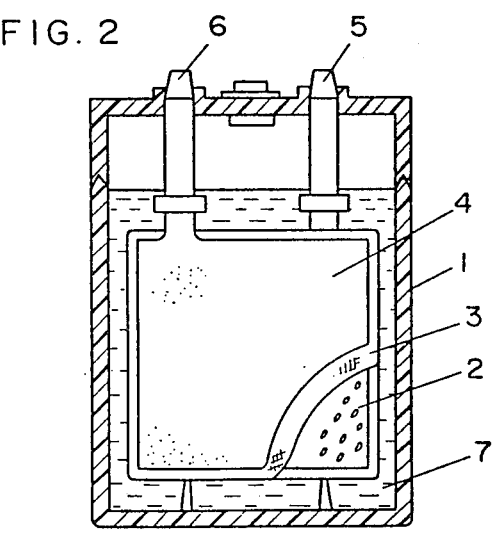
FIG. 2 is a longitudinal section view showing the lead storage battery in the secondary forming stage.

The reference numeral 1 represents a battery container, 2 a positive electrode, 3 a separator, 4 a negative electrode, 5 a positive electrode terminal, 6 a negative electrode terminal, and 7 an electrolyte. In the primary forming stage according to the present invention, the electrodes are partially immersed in an electrolyte solution as shown in FIG. 1. In the secondary forming stage, the electrodes are submerged in an electrolyte solution as illustrated in FIG. 2. In the above fundamental arrangement, forming conditions were varied to investigate the changes in high rate discharge characteristic and life cycle characteristic.

EXAMPLE 1

In the primary forming stage, the following aqueous solution was used as the electrolyte.
A: 0.5 wt. % of NaOH
B: 2 wt. % of $Na_2SO_4$
C: 1 wt. % of $H_2SO_4$
D: 10 wt. % of $H_2SO_4$
E: 15 wt. % of $H_2SO_4$ The rate of immersion of the electrodes in the electrolyte was set at a given level between 0%, i.e. the state in which the liquid level is just in contact with the lower edges of the electrodes, and 100%, where the top edges of the electrodes are level with the liquid level, and charging was effected with a current of 10 A (0.11 qA) for 2 minutes. Thereafter, a concentrated sulfuric acid was added to the container to adjust the electrolyte composition to a calculated sulfuric acid concentration of approximately 28 weight % and in the condition illustrated in FIG. 2, charging was effected with a 10 A current (0.11 qA) for 50 hours as the secondary charging stage. The batteries thus formed are designated A through E in correspondence with the codes of the electrolyte solutions used in the primary forming stage.

As control references, there were prepared and used Battery F which was formed directly in the secondary forming stage bypassing the primary forming stage and Battery G which was formed by passage through the primary forming stage but using a higher liquid level at a distance of 10 mm over the electrodes. Further, in the preparation of Battery G, electrolytes A through E were used in the primary forming stage.

Figure 3:
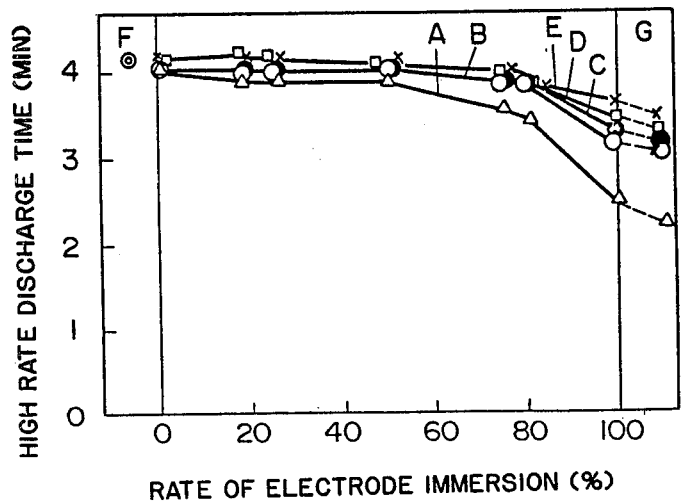
FIG. 3 is a diagram showing the relation of the rate of immersion of the electrodes in the electrolyte in the primary forming stage with the high rate discharge characteristic of the battery.
Figure 4:
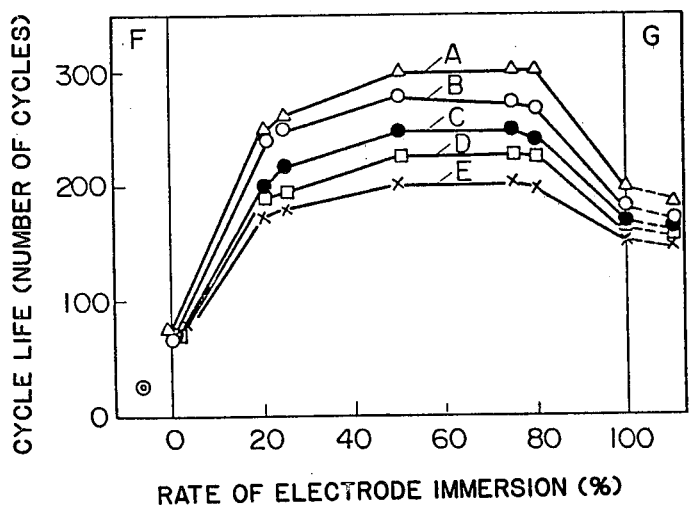
FIG. 4 is a diagram showing the relation of the rate of immersion of the electrodes in the primary forming stage with the cycle life characteristic of the battery.

There batteries were evaluated as follows. Regarding high rate discharge characteristic, discharging was effected with a 150 A current at the temperature of $-15°$ C. and the discharge time till the terminal voltage reached 1.0 V/cell was used as a parameter for comparison. As to cycle life characteristic, charging and discharging were repeated in cycles each consisting of 1-hour discharging with a 20 A current and 5-hour charging with a 5 A current and the number of cycles till the battery capacity dropped to less than 40% of the initial capacity was used as a comparison parameter. The relation of the above high rate discharge time with the rate of immersion of the electrodes in the primary forming stage is shown in FIG. 3, and the relation of cycle life with the rate of electrode immersion is shown in FIG. 4.

EXAMPLE 2

Using high-porosity pasted electrodes having a satisfactory high rate discharge characteristic, batteries were fabricated in the same manner as Example 1.

Battery (H) was prepared by using a 2 weight % aqueous solution of $Na_2SO_4$ and an immersion rate of 50% in the primary forming stage, and Battery (I) by using the same solution but adopting an immersion rate of approximately 100%, and charging was effected with a 9 A (0.1 qA) current for 6 minutes. Then, the secondary forming electrolyte was prepared by adding concentrated sulfuric acid till a calculated $H_2SO_4$ concentration of 30 weight % was attained.

The next step is concerned with the second aspect of improvement by the present invention. Thus, charging was effected with currents up to 90 A (1 qA) at the maximum for 5 minutes and, then, 50 Ah charging was effected with a reduced current of 9 A (0.1 qA).

Figure 5:
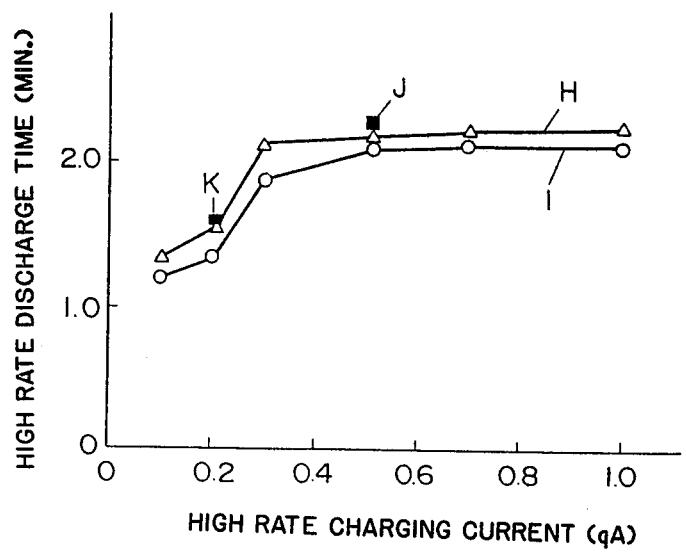
FIG. 5 is a diagram showing the relation of the value of a large current applied transiently to the electrodes with the high rate discharge characteristic of the battery.
Figure 6:
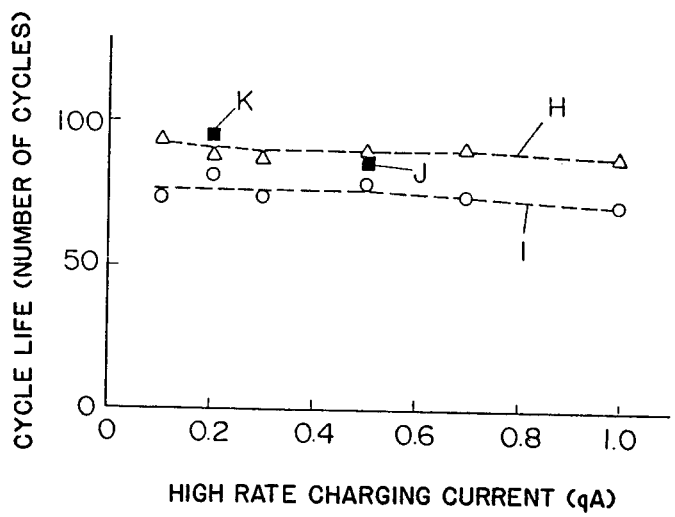
FIG. 6 is a diagram showing the relation of the value of a large current applied transiently to the electrodes with the cycle life characteristic of the battery.

The high rate discharge characteristics of the above batteries were compared in terms of the discharge time till the terminal voltage reached 1.0 V/cell under the discharging conditions of 300 A and $-15°$ C. The cycle life characteristics of the batteries were evaluated and compared by repeating charging and discharging in cycles each consisting of discharging with an 8 A current till the terminal voltage reached 1.6 V/cell and charging with a 5 A current for 10 hours and comparing the number of charge/discharge cycles till the battery capacity dropped to 50% of the initial capacity. These discharge time characteristics and the number of charge/discharge cycles, in comparison with the current values at the beginning of the secondary forming stage, are shown in FIG. 5 and FIG. 6, respectively.

EXAMPLE 3

In conducting the formation process using the electrolyte mentioned in Example 2 with an electrode immersion rate of 50%, concentrated sulfuric acid was added over a period of 3 minutes following the primary forming stage while the current supply was continued with a charging current increased from 9 A (0.1 qA) to 45 A (0.5 qA). The charging was further continued for 2 minutes, at the end of which time the charging current was decreased to 9 A (0.1 qA) for the secondary forming stage, whereby Battery J was prepared. As a reference control, Battery K was prepared by using the same 9 A (0.1 qA) current for both the primary and secondary forming stages. These batteries were evaluated in the same manner as Example 2. The results are shown in FIGS. 5 and 6.

EXAMPLE 4

Figure 7:
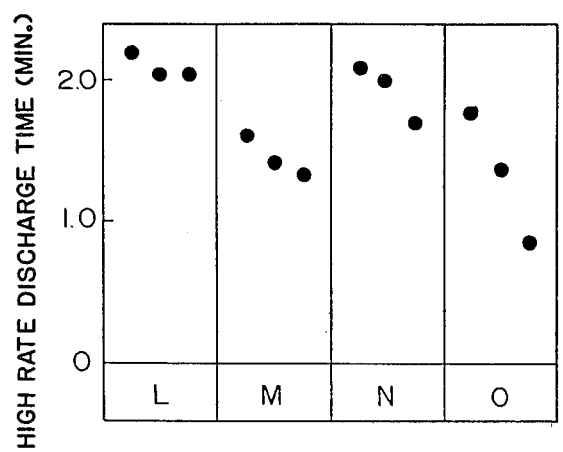
FIG. 7 is a diagram showing the relation of whether the electrolyte used in the primary forming stage is removed or not at the transition from that stage to the secondary forming stage with the uniformity of high rate discharge characteristic of the battery.

Using an electrode immersion rate of 50% and a 1 wt. % aqueous solution of NaOH as the electrolyte, adding an aqueous solution of sulfuric acid without withdrawal of the liquor after the primary forming stage, and interposing a short-time charging step using a 45 A (0.5 qA) current at the beginning of the secondary forming stage, Battery L was prepared in otherwise the same manner as Example 2. Battery M was prepared by omitting the 45 A charging step from the above procedure, Battery N by discarding the electrolyte used in the primary forming stage, adding an aqueous sulfuric acid solution and interposing the above short-time charging step using a 45 A (0.5 qA) current in the above procedure, and Battery O by the same procedure as used for Battery N but without inclusion of the 45 A charging step. FIG. 7 shows the discharge times of these batteries as discharged at $-15°$ C. with a 300 A current till 1.0 V/cell.

EXAMPLE 5

Using the electrode immersion rates of 50% (Battery P) and 100% (Battery Q), the primary forming stage was conducted using a weakly acidic aqueous solution containing 2 wt. % of $Na_2SO_4$ and 1 wt. % of sulfuric acid as the electrolyte and a current of 9 A (0.1 qA). Then, sulfuric acid was added to the above electrolyte to prepare a 28 wt. % (theoretical) aqueous solution of sulfuric acid and a short-time (10-minute) intensive charging step using a 27 A (0.3 qA) current was conducted, followed by a 50-hour charging procedure using a 9 A current. In the above primary forming procedure, after the 9 A charging was started, at least one step of discharging with a 9 A current for 1 minute was interposed, with the net charging amount for the primary forming stage being 9 A $\times$ 10 minutes.

Figure 8:
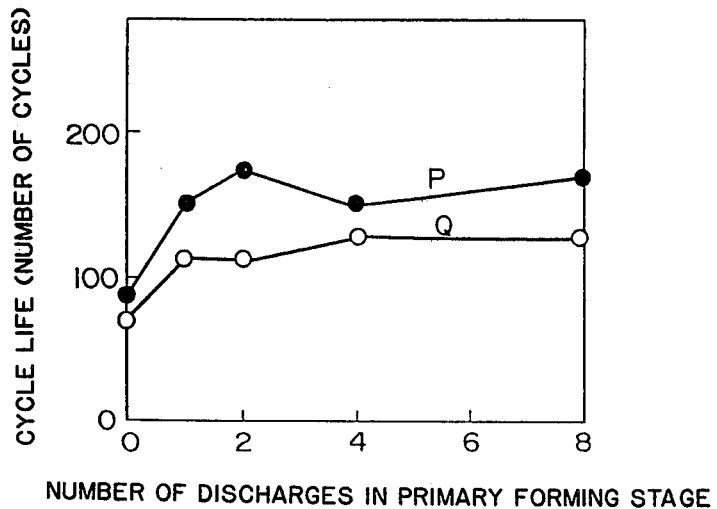
FIG. 8 is a diagram showing the relation of the number of discharges in the primary forming stage with the battery life.
Figure 9:
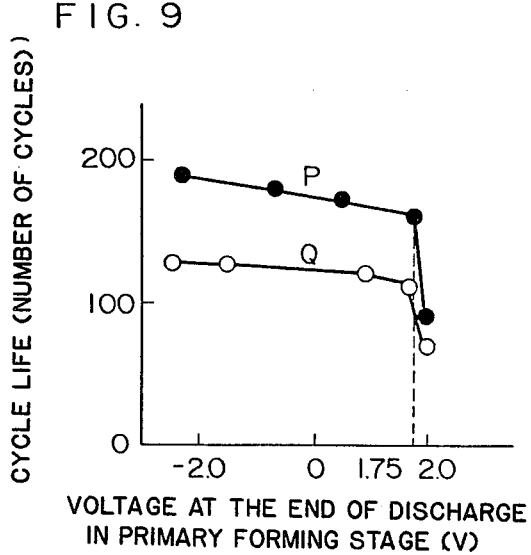
FIG. 9 is a diagram showing the relation of the discharge termination voltage in the primary forming stage with the battery life.

The cycle life characteristics of the batteries prepared as above were evaluated in the same manner as Example 2. The results are shown in FIG. 8. FIG. 9 shows the relation of the discharge time end voltage with the battery cycle life.

It will be apparent from FIG. 3 that Battery P prepared under partial immersion of the electrodes in the electrolyte in the primary forming stage showed a superior high rate discharge characteristic over a broad electrolyte pH range from weak $H_2SO_4$ acidity to akalinity as compared to Battery G which was prepared under complete submersion of the electrodes, and even when the electrode immersion rate was 75 to 80%, there was no significant difference from the battery prepared without a primary forming stage. This result is related with the fact that the upper part of the electrode contributes a great deal to high rate discharge characteristics. At the electrode immersion rate of 100%, a somewhat superior characteristic was obtained as compared with Battery G which was prepared under complete submersion of the electrodes in the liquor. This result suggests that the condition of 100% immersion is not like complete submersion, for example in the degree of accumulation of gases, and gives a result only second to the result obtainable by partial immersion.

On the other hand, as will be apparent from FIG. 4, the batteries prepared by conducting the primary forming stage under partial immersion of electrodes in the electrolyte invariably showed by far larger cycle numbers till capacity degradation than the cycle number for Battery F which was prepared without a primary forming stage and rather showed a longer cycle life than Battery G prepared under complete submersion of electrodes in the electrolyte. These results suggest, in the first place, that even under partial immersion, the liquor is carried to the part of the electrode above the free liquid level by a capillary action so as to sufficiently reform the interface between the grid and the active material. This can be surmised from the fact that an improvement over F could be achieved even at the immersion rate of 0, that is to say when the primary forming electrolyte was not removed at all and the lower edges of electrodes were merely contacted with the electrolyte. In the second place, under partial immersion the current density is clearly higher at the lower part of the electrode, which means a higher probability of $\alpha\text{-}PbO_2$ being formed at the lower part of the electrode so that the upper and lower parts will contribute to discharging in dissimilar degrees. On the other hand, as to G which was prepared under complete submersion of electrodes, it appears that $\alpha\text{-}PbO_2$ and $\beta\text{-}PbO_2$ are formed uniformly on both the upper and lower parts of the electrode so that the lower part of the electrode becomes more ready to discharge due, for example, to an increased concentration of the electrolyte and consequently the rate of contribution to discharge of the lower part is increased to thereby cause an early fall-off of the active material.

Then, as will be seen from FIG. 5, for the purpose of eliminating the influence of carryover of the primary forming liquor unsuited to the formation of comparatively active $PbO_2$ to the secondary forming stage, it was found effective to transiently apply a large current at the end of the primary forming stage or at the beginning of the secondary forming stage or at both times. The large current which is thus temporarily applied is preferably a current of not less than 0.3 qA and, particularly, of not less than 0.5 qA. The factors which would interfere with the formation of active $PbO_2$ in the secondary forming stage can thus be eliminated to a remarkable extent. Batteries H and I showed that this occurs under whichever of partial immersion and 100% immersion which, as aforesaid, is nearly equivalent to partial immersion. This effect is materialized by the large current which causes evolution of gases.

On the other hand, the difference between J and K shows that this application of a large current can be performed at the transition from the primary forming stage to the secondary forming stage without interruption of charging. This simplifies and makes more efficient the charging system wherein pasted electrodes are set in a battery container and formed in the form of a battery.

FIG. 7 suggests the possibility that the elimination of the electrolyte used in the primary forming stage does not necessarily exert a favorable influence on the activation process in the secondary forming stage but may cause a non-uniformity of high rate discharge characteristic. In contrast, the difference between N and O indicates that the above-mentioned transient application of a large current contributes favorably to the uniformity of high rate discharge characteristic. Moreover, the difference between M and O shows that it is basically more desirable to conduct the secondary forming stage without discarding the primary forming electrolyte but, instead, adding concentrated sulfuric acid thereto, and L shows that the concurrent use of the above two procedures results in a further improvement in the uniformity of characteristics.

Moreover, comparison of A to E in FIG. 3 shows clearly that the above-mentioned effect of the primary forming stage on the improvement of cycle life is greater in dilute aqueous sulfuric acid solutions not exceeding 15 weight % of $H_2SO_4$ and, also, on the alkaline side. In addition, as in the case of reforming of the interface between the grid and the active material, the greater the amount of electricity in the primary forming stage, the longer is the cycle life of the battery. However, an increased amount of electricity in the primary forming stage leads to an increased degree of degradation of high rate discharge characteristic and this degradation of high rate discharge characteristic cannot be completely avoided even when the electrodes are only partially immersed. Therefore, the amount of electricity in the primary forming stage is preferably about 20%, at the maximum, of the theoretical positive electrode capacity qAh. By way of illustration, when emphasis is placed on high rate discharge characteristic, it is desirable to employ a small amount of electricity ranging from 0.01 to 0.1% of qAh and an alkaline or near-neutral electrolyte which contributes to an improved cycle life. Thus, primary forming conditions should be selected according to the intended application of the battery. FIG. 8 shows that the cycle life of the battery can be improved by interposing at least one discharging step in the primary forming stage. The degree of such improvement was higher for P prepared with a lower immersion rate than Q. Moreover, the relation between the voltage at the end of 1-minute discharging and the cycle life of the battery prepared with the above-mentioned interposition of one discharge step indicates that the battery given a deep discharge has a superior cycle life. And the extent of this discharge is preferably at least 1.75 V/cell or less and, for better results, should experience a polarity reversal at 0 V/cell. It appears that by such a deep discharge, the protective layer of $\alpha$-$PbO_2$, etc. formed near the grid turns into a tough structure to thereby improve the life cycle characteristic.

The discharging in the secondary forming stage may be conducted as necessary. Moreover, the magnitude of the current for the above-mentioned transient discharge can be optionally selected.

INDUSTRIAL APPLICABILITY

As described hereinbefore, a lead acid storage battery satisfying both the desirable high rate discharge characteristic and the desirable life cycle can be provided in accordance with the present invention. Therefore, the present invention is of value for improving the characteristics of the maintenance-free batteries incorporating lead-calcium-tin alloy grids which tend to suffer from an early loss of capacity.

We claim:

1. A method of forming a lead acid storage battery comprising a primary forming stage wherein charging is effected in an electrolyte selected from the group consisting of alkaline aqueous solutions, neutral aqueous solutions and dilute aqueous sulfuric acid solutions and a secondary forming stage wherein charging is effected in a concentrated sulfuric acid-acidic electrolyte.

2. A method of forming a lead acid storage battery as claimed in claim 1, wherein the rate of immersion of the electrodes in the electrolyte is 20 to 80% of the height of the electrodes.

3. A method of forming a lead acid storage battery as claimed in claim 1 wherein at the end of said primary forming stage or at the beginning of said secondary forming stage or at both times a temporary step using charging a charging current of at least 0.3 qA based on the theoretical positive electrode capacity of qAh is interposed.

4. A method of forming a lead acid storage battery as claimed in claim 3, wherein said temporary charging step using a charging current of at least 0.3 qA is carried out at least in partial overlap with a step wherein the electrolyte composition for the primary forming stage is altered for the second forming stage.

5. A method of forming a lead acid storage battery as claimed in claim 1 wherein said primary forming stage is performed in a battery container containing said pasted electrodes and, then, an aqueous solution of sulfuric acid is added to the battery container without discarding the residual liquor for the conduct of said secondary forming stage.

6. A method of forming a lead acid storage battery as claimed in claim 1 wherein said primary forming stage includes at least one discharging step.

7. A method of forming a lead acid storage battery as claimed in claim 6 wherein the voltage at said discharging step experiences a level of 1.75 V/cell or less.

* * * * *